United States Patent [19]

Hayles

[11] Patent Number: 5,441,412
[45] Date of Patent: Aug. 15, 1995

[54] MAKE-UP KIT HAVING OVERLAYS WHICH FORM COMPOSITE MAKE-UP PATTERN AND METHOD OF USE

[76] Inventor: Mark C. Hayles, 822 Greenwich St.-Apr. GC, New York, N.Y. 10014

[21] Appl. No.: 344,533

[22] Filed: Nov. 23, 1994

Related U.S. Application Data

[63] Continuation of Ser. No. 36,805, Mar. 25, 1993, abandoned.

[51] Int. Cl.⁶ .............................. G09B 19/18
[52] U.S. Cl. ........................ 434/100; 434/98
[58] Field of Search ............... 434/100, 98, 99, 81, 434/102, 155, 365, 367, 368, 377, 269, 97, 96; 132/320

[56] References Cited

U.S. PATENT DOCUMENTS

| | | | |
|---|---|---|---|
| 1,964,274 | 6/1934 | Rodnon | 434/100 X |
| 1,981,923 | 11/1934 | Miller | 434/100 X |
| 2,088,076 | 7/1937 | Winslow . | |
| 2,623,304 | 12/1952 | Watson | 434/100 |
| 3,120,066 | 2/1964 | Reeves . | |
| 3,325,917 | 6/1967 | Kinnaman . | |
| 3,353,281 | 11/1967 | Schulze | 434/155 |
| 3,855,714 | 12/1974 | Block | 434/269 |
| 4,034,485 | 7/1977 | Milutinovich . | |
| 4,226,030 | 10/1980 | Quinn, III . | |
| 4,232,334 | 11/1980 | Dyson | 358/93 |
| 4,676,753 | 6/1987 | Haggas | 434/155 |

FOREIGN PATENT DOCUMENTS

| | | | |
|---|---|---|---|
| 1205702 | 2/1960 | France | 434/155 |
| 137981 | 10/1964 | France | 434/100 |
| 2227805 | 11/1974 | France | 434/100 |
| 1278192 | 6/1972 | United Kingdom | 434/155 |

*Primary Examiner*—Cary E. O'Connor
*Assistant Examiner*—Jeffrey A. Smith
*Attorney, Agent, or Firm*—Robin, Blecker, Daley & Driscoll

[57] ABSTRACT

A make-up kit which includes a plurality of overlays positionable one on top of the other with each of the plurality of overlays including make-up information for at least one or more facial features of the human face to illustrate how and where to apply make-up and to describe how to use, apply and select the desired make-up.

37 Claims, 3 Drawing Sheets

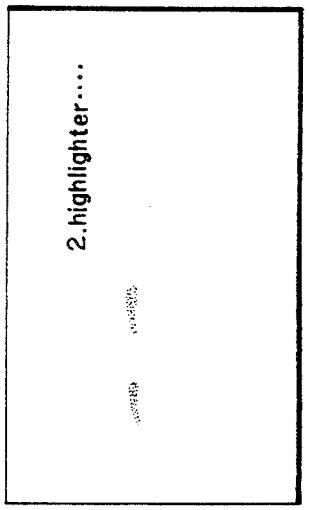
FIG. 3A
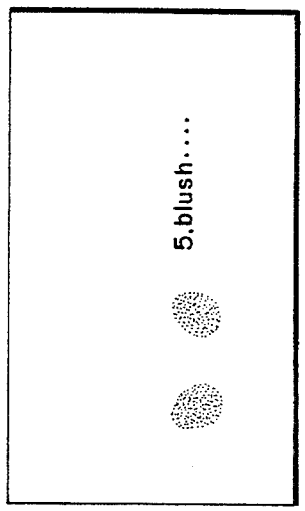
FIG. 3B
FIG. 3C
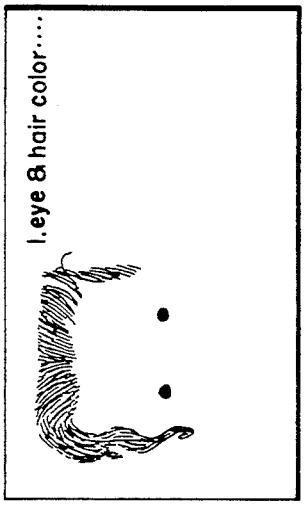
FIG. 3D
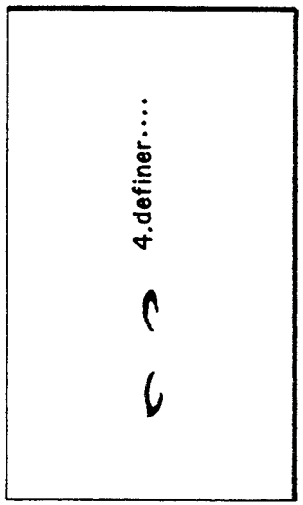
FIG. 3E
FIG. 3F
FIG. 3G
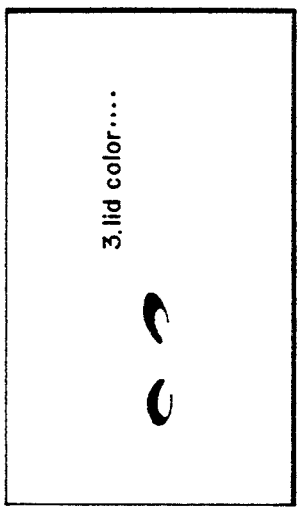
FIG. 3H

MAKE-UP KIT HAVING OVERLAYS WHICH FORM COMPOSITE MAKE-UP PATTERN AND METHOD OF USE

This is a continuation application under 37 CFR 1.62 of prior application Ser. No. 08/036,805, filed Mar. 25, 1993 (abandoned).

BACKGROUND OF THE INVENTION

This invention relates to a make-up kit and, in particular, to a make-up kit for the face which illustrates and describes for an individual how to select and apply make-up.

Various ways have been promoted or developed over the years to aid individuals in selecting and applying make-up. Typically, individuals will visit cosmetic counters at department stores or boutiques and a trained make-up consultant will look at an individual's hair and eye color, skin tone, etc., and will provide make-up advice for the individual. The make-up consultant will then select and apply the make-up while the individual is still at the store and often will provide the individual with a sheet which illustrates a made-up composite face and indicates where make-up has been applied to the individual's face.

U.S. Pat. No. 4,232,334 to Dyson ("Dyson") discloses a cosmetic apparatus which helps a make-up consultant generate an appropriate make-up pattern for a customer's face. The cosmetic apparatus includes a graticule or screen through which the make-up consultant views the customer's face and upon which the make-up consultant marks a number of predetermined locations. These locations are aligned with a selected number of significant facial points and form an outline of the customer's face. With this outline, the make-up consultant selects a reference face pattern from a group of different reference face patterns which best corresponds to the customer's face shape, i.e., heart-shaped face, diamond-shaped face, etc.

A scaled, fully made-up face pattern is then displayed on the selected reference face pattern directly or on a separate transparency overlaid on the reference pattern. This provides the make-up consultant with a fully made-up face for illustrating to the customer what make-up products are needed and how they should be applied.

In another embodiment of the Dyson patent, a video camera is used in place of the graticule, to image the customer's face on a screen at a console. This permits the make-up consultant to select via the screen significant facial points relative to the displayed image of the customer's face. Similar to the manual operation described above, a reference set of outline signals is then selected which best fits the selected facial points. A stored make-up pattern which corresponds to the selected reference set of outline signals is then displayed with the reference set to provide an image of a fully-made up face.

While the above practices exemplify various ways in which information for selecting and applying make-up is provided to an individual, each requires that the individual or customer journey to a department store or boutique for consultation with a make-up consultant. An individual, therefore, is not able to obtain informative and descriptive make-up information in the convenience of the individual's home. Furthermore, in these prior practices only a fully made-up composite face is provided to an individual who must then attempt to visualize from the composite how and where make-up is to be applied to the individual facial features. In addition, these prior practices require the individual to recall from memory any verbal directions given by the make-up consultant.

It is, therefore, an object of the present invention to provide a make-up kit which provides step-by-step customized make-up information for an individual in an easy-to-follow format.

It is a further object of the present invention to provide a make-up kit which includes make-up information for an individual's facial features which can be viewed separately for each feature or as a composite.

It is an additional object of the present invention to provide a make-up kit which provides simple illustrations and descriptions of how to select and apply make-up.

It is a further object of the present invention to provide a make-up kit which has a simple design and presentation to permit easy use and instruction.

It is a further object of the present invention to provide a make-up kit which can be used at any time, i.e., in the home or office or while traveling, without requiring consultation with a make-up consultant.

It is an additional object of the present invention to provide a make-up kit which can be based upon a particular color palette which is selected according to the needs of the individual or which can be designed to create a make-up appearance for a particular event.

SUMMARY OF THE INVENTION

In accordance with the principles of the present invention, the above and other objectives are realized in a make-up kit which includes a plurality of overlays positionable one on top of the other. Each of the plurality of overlays includes make-up information for at least one or more facial features of an individual's face.

In its preferred form, the make-up kit comprises a face drawn on a base member. This face serves as an outline or background over which the plurality of overlays containing the make-up information are positioned to form a composite make-up pattern. The information on each particular overlay may include an illustration and/or description of how and where to apply make-up to the particular facial features or areas, i.e., eyes, lips, etc., associated with the overlay.

BRIEF DESCRIPTION OF THE DRAWINGS

The above and other features and aspects of the present invention will become more apparent upon reading the following detailed description in conjunction with the accompanying drawings, in which:

FIGS. 3A–3H show plan views of the base member and the individual overlays of FIG. 1.

DETAILED DESCRIPTION

Figure 1:
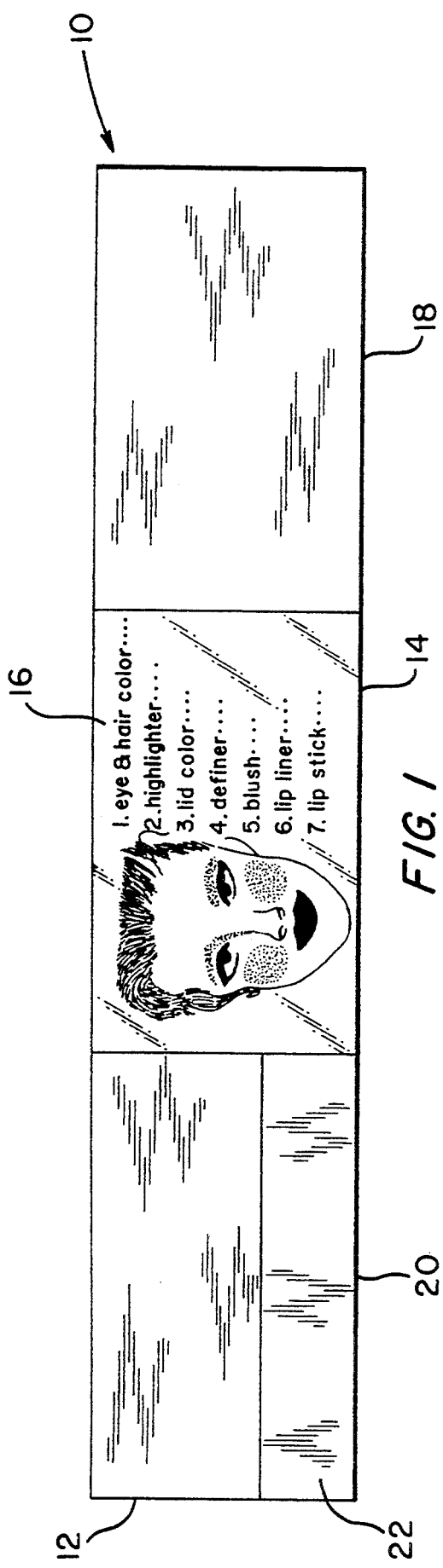
FIG. 1 shows a plan view of a make-up kit in an unfolded open position in accordance with the principles of the present invention.
Figure 2:
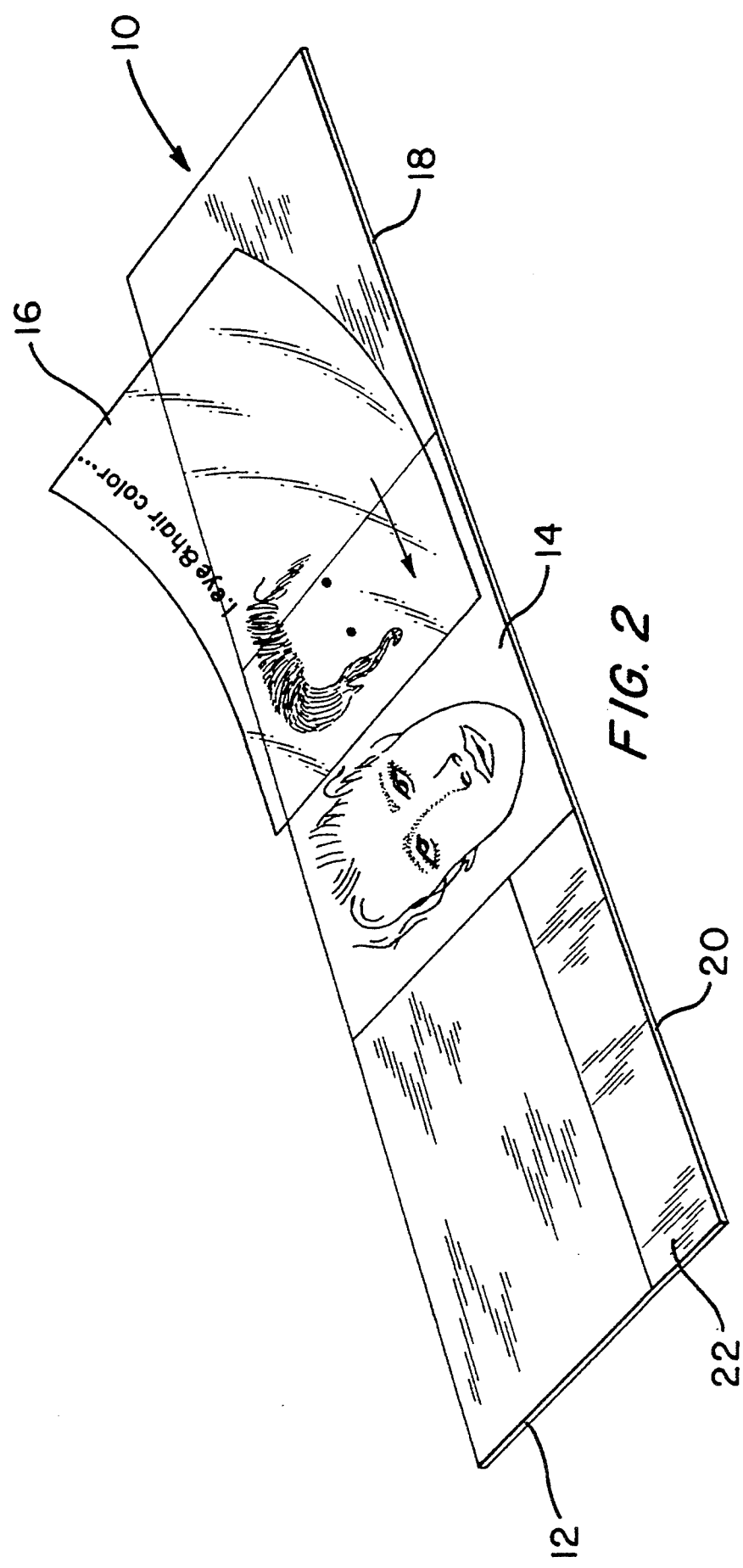
FIG. 2 shows a three-dimensional view of the make-up kit of FIG. 1 with an overlay being insertably positioned on top of a base member.

The make-up kit 10 of the invention comprises a folder or booklet 12 which is shown in an unfolded open position in FIGS. 1–2. A base member 14 forms the center of the folder 12 and has an outline of the face of an individual printed or drawn thereon. The base member 14 may be a board, sheet, overlay or the like. As shown, the outline of the face drawn on the base member 14 includes the following facial features: face shape, hair, eyes, nose and lips.

The make-up kit 10 also comprises a plurality of overlays or transparencies 16 each of which includes make-up information for at least one or more facial features of the individual. The overlays 16 are positionable one on top of the other on top of the base member 14. When so positioned, the illustration of make-up applied to a particular area of a given facial feature on each overlay overlies the corresponding area of the facial feature of the face outlined on the base member 14. Accordingly, with all the overlays 16 in place on the base member, a completely made-up face is presented.

As shown, the make-up information on each overlay 16 provides an illustration of how and where to apply make-up to the particular area of the facial feature or features covered by the overlay. Additionally, each overlay provides written descriptions or instructions, tips and other relevant information explaining how and where to applying and how to select the makeup for the particular area.

FIGS. 3A–3H illustrate individually the base member 14 and the overlays 16. The base member 14 (as shown in FIG. 3A) is positioned as a background to the overlays 16 and then the overlays for eye and hair color (FIG. 3B), highlighter (FIG. 3C), eyelid color (FIG. 3D), definer (FIG. 3E), blush (FIG. 3F), lip liner (FIG. 3G) and lipstick (FIG. 3H)), are insertably positioned or placed ,one on top of the other in that order. This order is generally the order one follows in applying make-up. However, in using the make-up kit 10, an individual is not limited to this particular order and may rearrange the overlays in any manner which would appeal to the user.

As shown in FIG. 3A, the base member 14, which illustrates the outline of the individual's facial features, may be a simple black and white outline of a typical face or may be customized to illustrate the individual's facial features. In addition, the face represented on the base member 14 may have features which exhibit racial or ethnic origin, gender, skin tone, age characteristics, etc. The base member 14 may also be made of a transparent material or an overlay and may have make-up information illustrated or written thereon.

On top of the base member 14 is positioned the overlay (FIG. 3B) which illustrates both the eye and hair color of the individual. There may also be multiple overlays utilized to illustrate these features. As shown in FIG. 3B, make-up instructions located on the overlay may recite: 1. EYE AND HAIR COLOR—Make-up for an individual with blonde hair and blue eyes.

Next, the overlay for highlighter, as shown in FIG. 3C, is positioned over the overlay of FIG. 3B to illustrate where highlighter is to be applied. Instructions for this overlay may read: 2. HIGHLIGHTER—Apply highlighter to the area below the eyebrows and along the browbone to accentuate the eye area of the individual.

The overlay for eyelid color, as shown in FIG. 3D is next positioned and depicts eyelid color suggested for the individual. Eyelid color is to be applied to the surface of the eyelids and directly under the lower eyelashes with instructions that may read: 3. LID COLOR—Apply lid color over the entire eyelid starting from the inner corner of the eyelid and working to the outer edge of the eyelid. The lid color should go above the crease line of the eyelid. Blend this color with the highlighter. Apply a little of the lid color directly under the lower lashes to accent the eyes.

Then, the overlay for eyelid definer, as shown in FIG. 3E, is positioned on top of the overlay of FIG. 3D. Eyelid definer defines and accents the eye area and is applied directly above and adjacent to the top eyelashes and below and adjacent to the bottom eyelashes. Its instructions state: 4. DEFINER—Start at the inner corner of the eye and trace along slightly above the top eyelash line to the outer edge of the eye. Again start at the inner corner of the eye and trace along slightly below the bottom eyelash line to the outer edge of the eye. When defining, position the applicable eyelid with a finger to line as close to the eyelashes as possible. Evenly coat the top and bottom eyelashes with mascara.

Next the overlay of FIG. 3F for blush is positioned on top of the overlay of FIG. 3E. This overlay specifies where blush is to be applied to and its instructions read: 5. BLUSH–Sweep on top of the cheekbones starting with the apple of the cheek and working up toward the ear.

Finally on top of the overlay of FIG. 3F, the overlays of FIGS. 3G and 3H are, respectively, positioned. These overlays illustrate where to apply lip liner and lipstick, respectively. Their respective instructions read: 6. LIP LINER—Trace the outer edges of your lips. Fill-in applicable areas of the lips as needed to create an even appearance. 7. LIPSTICK—Fill in the inner area you have made with the LIP LINER with lipstick to complete a polished appearance.

The make-up illustrations and instructions for the overlays 16 shown in the figures and described above are only illustrative of the type of information which may be incorporated in the overlays. Generally, any type of make-up information which may assist the individual in selecting and applying make-up can be used. Moreover, the present invention is not limited to the specific overlays depicted and may also include overlays which illustrate foundation application, skin tone, etc., in order to assist in creating a polished cosmetic appearance.

As indicated above, the base member 14 forms the center of the folder 12 of the make-up kit 10. The folder 12, also includes a right section 18 and a left section 20 which are pivotally attached to the base member 14. A pocket 22 (see FIGS. 1 and 2) is incorporated into the right section 18 for storing the overlays 16 when they are not being displayed or when only a selected number are desired for make-up guidance and information. For example, if an individual does not wish to apply lip liner or lipstick, those corresponding overlays (see FIGS. 3G and 3H) may be stored or set aside in the pocket 22 of the folder 12. The pocket 22 may be incorporated at any location in the folder 12 and any means may be utilized for securing the overlays 16 in the folder 12 for display or for preventing loss.

The make-up kit 10 of the present invention can be implemented as an individually customized package of make-up information based upon an individual's own unique facial features. To create this package, an individual can submit or send a photograph illustrating the individual's facial features as well as any other information or characteristics which may be considered relevant in developing the individual's customized make-up kit 10. From the photograph, a make-up consultant can analyze and review the individual's features and personalized information. Based on this review, the make-up consultant can then select a base member and corresponding overlays customized to the individual.

In addition to the make-up selection being dependent on an individual's facial features, the make-up kit 10 of the invention may also be arranged to illustrate a color palette dependent on a particular season, i.e., fall, winter, spring or summer, on the time of day, i.e, day or evening, on an event or occasion, i.e., wedding, dance, party, business, leisure, etc., or on a particular color scheme, i.e., corals, earthtones, etc. In addition, the written information on the overlays or base member may include not only information on how to apply and select make-up but may also include a description of the particular brands of make-up which may be utilized to achieve the desired effect or other information relevant to make-up application and product description.

In addition to using dyes, inks or other means on the overlays to illustrate where the make-up should be applied on the respective facial features, the actual make-up to be applied to the facial features may also be imprinted on the overlay.

Each of the overlays 16 may be made of a thin transparent or clear material. Typical materials might be vinyl acetate, plastic or the like.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A make-up kit comprising:
 a plurality of overlays positioned one on top of the other, each of said plurality of overlays including make-up information for at least one or more facial features of the human face, said make-up information being positioned on said overlays such that when said overlays are selectively positioned one on top of the other said make-up information at least depicts and forms a composite make-up pattern for the corresponding facial features of the human face.

2. A make-up kit according to claim 1, wherein said make-up information of a given overlay comprises an illustration on said given overlay of particular make-up for a particular area of a given facial feature.

3. A make-up kit according to claim 2, wherein said makeup information of said given overlay further comprises instructions for applying said particular make-up to said particular area of said given facial feature.

4. A make-up kit according to claim 3, further comprising:
 a base member having outlined thereon one or more facial features simulative of human facial features;
 and said make-up information being positioned on said overlays such that when said overlays are positioned one on top of the other on said base member the illustration of make-up for a particular area of a given facial feature on a given overlay overlies the corresponding area of the corresponding facial feature outlined on the base member.

5. A make-up kit according to claim 4, wherein:
 said one or more facial features simulative of human facial features outlined on said based member include at least an outline simulative of human face shape, an outline simulative of human hair, an outline simulative of human eyes, an outline simulative of a human nose, an outline simulative of human lips, an outline simulative of human eyebrows, an outline simulative of the human browbone, an outline simulative of human eyelids, an outline simulative of human top and bottom eyelashes and an outline simulative of human cheekbones.

6. A make-up kit according to claim 5, further comprising:
 a further overlay in addition to said plurality of overlays, said further overlay including an illustration of eye color and an illustration of hair color, said illustration of eye color and illustration of hair color being positioned on said further overlay such that when said further overlay is positioned on top of said base member said illustration of eye color overlies the areas of said base member which contain the outline simulative of the human eyes and so that said illustration of hair color overlies the areas of said base member which contain the outline simulative of the hair.

7. A make-up kit according to claim 6, wherein:
 said plurality of overlays include a first overlay comprising an illustration of highlighter, said illustration of highlighter being positioned on said first overlay such that when said first overlay is positioned over said base member said illustration of highlighter overlies the areas of said base member which are below the areas of said base member which contain the outline simulative of the eyebrows and which are along the areas of said base member which contain the outline simulative of the browbone.

8. A make-up kit according to claim 7, wherein:
 said plurality of overlays include a second overlay comprising an illustration of eyelid color, said illustration of eyelid color being positioned on said second overlay such that when said second overlay is positioned over said base member said illustration of eyelid color overlies the areas of said base member which contain the outline simulative of the eyelids and the areas of said base member which are directly under the areas which contain the outline simulative of the bottom eyelashes.

9. A make-up kit according to claim 8, wherein:
 said plurality of overlays include a third overlay comprising an illustration of eyelid definer, said illustration of eyelid definer being positioned on said third overlay such that when said third overlay is positioned over said base member said illustration of eyelid definer overlies areas of said base member which are directly below and adjacent the areas of said base member which contain the outline simulative of the bottom eyelashes and which are directly above and adjacent the areas of said base member which contain the outline simulative of the top eyelashes.

10. A make-up kit according to claim 9, wherein:
 said plurality of overlays include a fourth overlay comprising an illustration of make-up of blush, said illustration of make-up of blush being positioned on said fourth overlay such that when said fourth overlay is positioned over said base member said illustration of make-up of blush overlies areas of said base member which contain the outline simulative of the cheekbones.

11. A make-up kit according to claim 10, wherein:

said plurality of overlays include a fifth overlay comprising an illustration of lip liner, said illustration of lip liner being positioned on said fifth overlay such that when said fifth overlay is positioned over said base member said illustration of lip liner overlies areas of said base member which are at the outer contour of the areas of said base member which contain the outline simulative of the lips.

12. A make-up kit according to claim 11, wherein: said plurality of overlays include a sixth overlay comprising an illustration of lipstick, said illustration of lipstick being positioned on said sixth overlay such that when said sixth overlay is positioned over said base member said illustration of lipstick overlies areas of said base member which contain the outline simulative of the lips.

13. A make-up kit according to claim 12, wherein said further overlay is under said plurality of overlays and said plurality of overlays are one on top of the other in the following order starting with the bottommost one of said plurality of overlays: first, second, third, fourth, fifth and sixth.

14. A make-up kit according to claim 13, wherein: each of said plurality of overlays and said further overlay comprise a transparent material.

15. A make-up kit according to claim 6, wherein: each of said plurality of overlays and said further overlay comprise a transparent material.

16. A make-up kit according to claim 6, wherein said facial features outlined on said base member account for racial or ethnic origin.

17. A make-up kit according to claim 6, wherein said base member includes skin tone for said outlined facial features.

18. A make-up kit according to claim 3, wherein: each of said plurality of overlays comprises a transparent material.

19. A make-up kit according to claim 3, wherein: said plurality of overlays include a first overlay comprising an illustration of highlighter.

20. A make-up kit according to claim 3, wherein: said plurality of overlays include a first overlay comprising an illustration of eyelid color.

21. A make-up kit according to claim 3, wherein: said plurality of overlays include a first overlay comprising an illustration of eyelid definer.

22. A make-up kit according to claim 3, wherein: said plurality of overlays include a first overlay comprising an illustration of blush.

23. A make-up kit according to claim 3, wherein: said plurality of overlays include a first overlay comprising an illustration of lip liner.

24. A make-up kit according to claim 3, wherein: said plurality of overlays include a first overlay comprising an illustration of lipstick.

25. A make-up kit according to claim 3, wherein: said overlays are customized to an individual's characteristics and information.

26. A make-up kit according to claim 3, wherein: the make-up information of said given overlay further includes a description of one or more brands of make-up which can be utilized for the make-up of the particular area of said give facial feature.

27. A make-up kit according to claim 1, wherein at least one of said plurality of overlays includes skin tone for said facial features.

28. A make-up kit according to claim 1, wherein each of said plurality of overlays comprises a transparent material.

29. A make-up kit according to claim 28, wherein said transparent material comprises vinyl acetate.

30. A make-up kit according to claim 28, wherein said transparent material comprises a thin plastic.

31. A method for illustrating how to select and apply make-up which comprises:
providing a plurality of overlays each of which includes make-up information for at least one or more facial features of the human face, said make-up information being positioned on said overlays such that when said overlays are selectively positioned one on top of the other said make-up information at least depicts and forms a composite make-up pattern of the corresponding facial features of the human face; and
selectively positioning said plurality of overlays one on top of the other as an aid to an individual for selecting and applying make-up.

32. A method in accordance with claim 31, wherein: said make-up information of a given overlay comprises an illustration on said given overlay of particular make-up for a particular area of a given facial feature.

33. A method in accordance with claim 32, wherein: said make-up information of said given overlay further comprises instructions for applying said particular make-up to said particular area of said given facial feature.

34. A method in accordance with claim 33, wherein: said method further comprises providing a base member having outlined thereon one or more facial features simulative of human facial features; and said overlays are positioned one on top of the other on said base member so that the illustration of make-up for a particular area of a given facial feature on a given overlay overlies the corresponding area of the corresponding facial feature outlined on the base member.

35. A method in accordance with claim 34, wherein: said one or more facial features include at least face shape, hair, eyes, nose and lips.

36. A method in accordance with claim 35, wherein: each of said plurality of overlays comprises a transparent material.

37. A method in accordance with claim 36, wherein: said overlays are customized to an individual's characteristics and information.

* * * * *